(No Model.)
E. F. VALIQUET.
SCREW CUTTING LATHE.
No. 432,585.
Patented July 22, 1890.
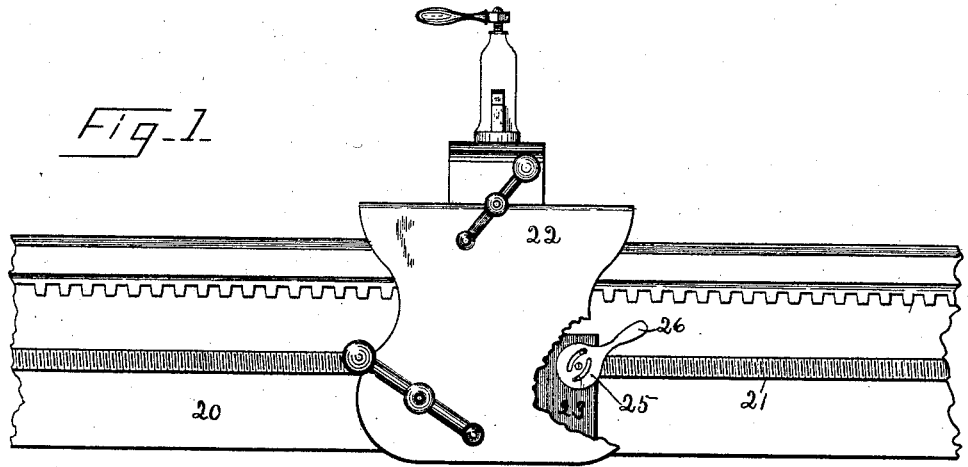
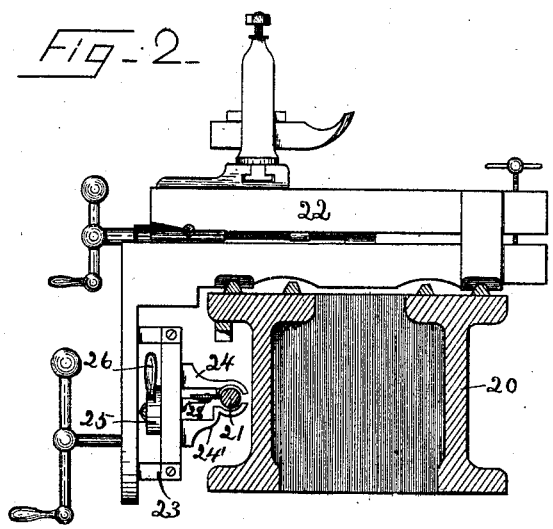
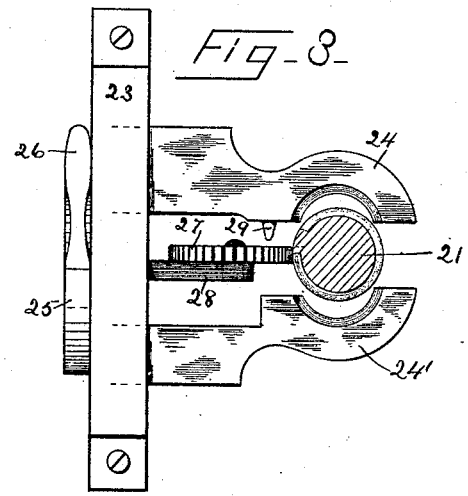
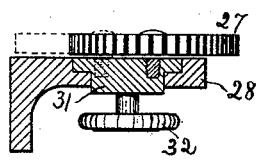
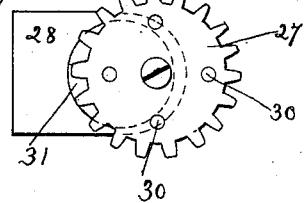
Witnesses
Inventor
Ephrem F. Valiquet.
By his Attorney
Frank H. Allen.

UNITED STATES PATENT OFFICE.

EPHREM F. VALIQUET, OF NORWICH, CONNECTICUT, ASSIGNOR OF ONE-HALF TO NAPOLEON MAYOTTE, OF SAME PLACE.

SCREW-CUTTING LATHE.

SPECIFICATION forming part of Letters Patent No. 432,585, dated July 22, 1890.

Application filed April 21, 1890. Serial No. 348,859. (No model.)

*To all whom it may concern:*

Be it known that I, EPHREM F. VALIQUET, a subject of the Queen of Great Britain, residing at Norwich, in the county of New London and State of Connecticut, have invented certain new and useful Improvements in Screw-Cutting Lathes, which improvements are fully set forth and described in the following specification, reference being had to the accompanying sheet of drawings.

This invention is in screw-cutting-engine lathes, and has for its object to so improve such lathes by simple and inexpensive changes that much time may be saved in cutting screws of any considerable length. Lathes of this class are commonly provided with a feed-screw, (extending parallel with the bed,) which is traversed by a nut attached to the tool-carriage. In many instances this nut is formed of two companion sections that may be simultaneously brought together to clasp the feed-screw, or may be separated when not using the lathe for screw-cutting. As a rule, when cutting a thread in such lathes after having run the tool to the length of the cut, the direction of rotation of the spindle and connected work that is being turned is reversed, and the tool-carriage is slowly carried backward in the same manner in which it was moved forward—that is to say, the nut on the feed-screw traverses the said screw backward until the tool is in a position to take a new cut. This moving of the tool-carriage backward by means of the feed-screw is necessarily a slow process, and my present invention has for its object such improvements as will permit the split nut to be separated and thrown out of engagement with the feed-screw, while the carriage is quickly run back by means of the rack-and-pinion feed used in ordinary turning. When the tool is in proper position for a new cut, the split-nut is closed on the feed-screw, which meanwhile has been running continuously in the same direction. If this were attempted in lathes as now commonly made, there would be no certainty that the tool would enter the thread and follow the previous cut, and the chances would be many for spoiling the thread; but with my added improvements the carriage may be run back by hand and the nut closed on the feed-screw with an absolute certainty that the point of the cutting-tool will register perfectly with the previous cut.

To assist in explaining my invention I have annexed a sheet of drawings, in which—

Figure 1 shows a portion of a lathe-bed having attached thereto the feed-screw and tool-carriage. Fig. 2 is a cross-section of a similar lathe on line *x x* of Fig. 1. Fig. 3 is an enlarged view of the feed-screw and split nut and the parts immediately connected with said nut. Figs. 4 and 5 show edge and plan views, respectively, of the gear 27, which forms an important element in my invention and the bracket-arm which supports said gear.

Referring to the drawings, the figure 20 denotes the bed of a lathe, 21 the feed-screw, and 22 the tool-carriage, all substantially as now provided in lathes of this class. Secured to the inner side of the shield of the carriage 22 is a frame 23, in which the two half-sections 24 24' of the split nut are supported and arranged to slide vertically. Each of said nut-sections has a stud that projects through frame 23 into cam-slots in a disk 25, which may be partially rotated by means of an operating-handle 26. When handle 26 is moved in one direction, the studs and half-nuts are forced apart, and when said handle is moved in the opposite direction said nuts are brought together to clasp the feed-screw. This manner of supporting and moving the split nut is the same as is now commonly employed, and I make no claim to the same. The mechanism which I have added to obtain the desired result consists, essentially, of a gear 27, which is pivotally supported on a bracket-arm 28 between the two nut-sections and a stud 29 (on one of said nut-sections) that may enter corresponding holes 30 in said gear as the nut closes on the feed-screw. The gear 27 is rotated constantly by the feed-screw, and the holes 30 in said gear are in such accurate relation to the threads of the feed-screw that if stud 29 enters either of said holes the tool will register with the previous cut or cuts. If the operator attempts to close the nut on the feed-screw when holes 30 are not in position to receive stud 29, said nut is held open until the gear partially rotates and brings the next hole into coincidence with the stud, when the nut may be closed. It will thus be seen that the nut cannot be brought into operative engagement with the feed-screw, except at such stated times as the stud 29 can enter holes 30, so that it becomes impossible to spoil the screw that is being turned because of the failure of the tool to register with the thread of said screw.

When the lathe is being used for ordinary turning, the gear 27 turns idly; or, if desired, it may be so supported that it may be thrown out of mesh with the feed-screw. In Figs. 4 and 5 the pivot of said gear is supported in a thimble or disk 31, that is rotatably seated in the bracket-arm 28, and has at its lower side a milled head 32, by means of which said disk 31 may be partially rotated in its seat. The pivot of gear 27 is located at one side of the center of disk 31, so that a half-revolution of said disk serves to withdraw the said gear from the feed-screw.

The addition to new lathes of my described improvement adds but little to their cost, and the construction is so simple that it may be easily and cheaply applied to old lathes that have the split nut and feed-screw.

Having described my invention, I claim—

1. In combination with the feed-screw and nut of a lathe, a perforated gear in mesh with said screw, and a stud carried by said nut adapted to enter the perforations, as and for the purpose specified.

2. In combination with the feed-screw and nut of a lathe, a perforated gear supported by an adjustable pivot and capable of being moved into and out of mesh with the feed-screw, and a stud on said nut that may enter the said gear-perforations, all substantially as and for the object specified.

EPHREM F. VALIQUET.

Witnesses:
FRANK H. ALLEN,
WM. D. MCJENNETT.